US012580772B2

(12) United States Patent
Hamada et al.

(10) Patent No.: US 12,580,772 B2
(45) Date of Patent: Mar. 17, 2026

(54) SECURE CONSOLIDATION SYSTEM, INFORMATION PROCESSING APPARATUS, SECURE CONSOLIDATION METHOD, AND PROGRAM

(71) Applicant: NTT, Inc., Tokyo (JP)

(72) Inventors: Koki Hamada, Tokyo (JP); Koji Chida, Tokyo (JP); Masanobu Kii, Tokyo (JP); Atsunori Ichikawa, Tokyo (JP); Junichi Tomida, Tokyo (JP)

(73) Assignee: NTT, Inc., Tokyo (JP)

( * ) Notice: Subject to any disclaimer, the term of this patent is extended or adjusted under 35 U.S.C. 154(b) by 245 days.

(21) Appl. No.: 18/556,931

(22) PCT Filed: May 21, 2021

(86) PCT No.: PCT/JP2021/019341
§ 371 (c)(1),
(2) Date: Oct. 24, 2023

(87) PCT Pub. No.: WO2022/244226
PCT Pub. Date: Nov. 24, 2022

(65) Prior Publication Data
US 2024/0214213 A1 Jun. 27, 2024

(51) Int. Cl.
*H04L 9/32* (2006.01)
*H04L 9/06* (2006.01)
*G09C 1/00* (2006.01)

(52) U.S. Cl.
CPC .......... *H04L 9/3242* (2013.01); *H04L 9/0618* (2013.01); *G09C 1/00* (2013.01);
(Continued)

(58) Field of Classification Search
CPC ... H04L 9/3242; H04L 9/0631; H04L 9/0643; H04L 2209/08; G09C 1/00
See application file for complete search history.

(56) References Cited

U.S. PATENT DOCUMENTS 11,797,540 B2 * 10/2023 Ikarashi .............. G06F 16/2456
11,888,973 B2 * 1/2024 Ikarashi .................. H04L 9/085
(Continued)

OTHER PUBLICATIONS

Koji Chida, Dai Igarashi, Koki Hamada, Katsumi Takahashi, "Anonymous Equijoin Protocol and its Applications", In SCIS, pp. 1-8, Jan. 25-28, 2011.

*Primary Examiner* — Ellen Tran
(74) *Attorney, Agent, or Firm* — IPUSA, PLLC

(57) ABSTRACT
The secure join system includes the first and second information-processing-apparatuses respectively holding first and second data. The second information-processing-apparatus is configured to: create third and fourth vectors in which a hash-value related to a key-value of the first data in a first vector and a ciphertext of the first data corresponding to the key-value in a second vector are rearranged by permutation; and create a fifth vector having a hash-value related to a key-value of the second data. The first information-processing-apparatus is configured to: search for j in which a hash-value of an i-th element of the fifth vector matches a j-th element value of the third vector for each i and create encrypted data in which a ciphertext of a j-th element value of the fourth vector is set when j is found and a ciphertext of a dummy value is set when j is not found.

8 Claims, 3 Drawing Sheets

(52) U.S. Cl.
CPC .......... *H04L 9/0631* (2013.01); *H04L 9/0643* (2013.01); *H04L 2209/08* (2013.01)

(56) References Cited

U.S. PATENT DOCUMENTS

| | | | |
|---|---|---|---|
| 12,079,363 B2 * | 9/2024 | Ikarashi .................... | G06F 7/76 |
| 2012/0011108 A1 * | 1/2012 | Bensberg ........... | G06F 16/2255 |
| | | | 707/E17.017 |
| 2013/0159731 A1 * | 6/2013 | Furukawa ............. | G06F 21/602 |
| | | | 713/189 |
| 2013/0179684 A1 * | 7/2013 | Furukawa ................ | H04L 9/16 |
| | | | 713/165 |
| 2016/0182222 A1 * | 6/2016 | Rane ................... | H04L 63/0428 |
| | | | 713/168 |
| 2017/0255675 A1 * | 9/2017 | Chavan ............ | G06F 16/24562 |
| 2019/0205561 A1 * | 7/2019 | Sierra ................ | G06F 21/6245 |
| 2019/0251069 A1 * | 8/2019 | Walker ................ | G06F 16/2255 |
| 2021/0182419 A1 * | 6/2021 | Ikarashi ................. | H04L 9/085 |
| 2021/0263921 A1 * | 8/2021 | Ikarashi ................... | G09C 1/00 |
| 2021/0314145 A1 * | 10/2021 | Ikarashi ................ | G06F 7/726 |
| 2024/0214212 A1 * | 6/2024 | Hamada ................... | G09C 1/00 |

* cited by examiner

Fig. 1

SECURE CONSOLIDATION SYSTEM, INFORMATION PROCESSING APPARATUS, SECURE CONSOLIDATION METHOD, AND PROGRAM

TECHNICAL FIELD

The present invention relates to a secure join system, an information processing apparatus, a secure join method, and a program.

BACKGROUND ART

There is a method called secure join as a method for joining data between two parties without mutually disclosing data and without disclosing which data is joined (see, for example, Non Patent Literature 1). In the method described in Non Patent Literature 1, data held by each party is encrypted and collected by one party, and hash values of both keys are collated to specify data having a common key, thereby creating a ciphertext of the joined data.

CITATION LIST

Non Patent Literature

Non Patent Literature 1: Koji Chida, Dai Ikarashi, Koki Hamada, Katsumi Takahashi, Anonymous Equijoin Protocol and its Applications, In SCIS, 2011.

SUMMARY OF INVENTION

Technical Problem

However, in the method in related art, it is necessary to transmit and receive all ciphertexts of data held by both parties between the two parties. Thus, in a case where at least one party has large data, a communication amount is large.

An embodiment of the present invention has been made in view of the above points, and an object thereof is to implement secure join with a small communication amount.

Solution to Problem

In order to achieve the above object, a secure join system according to an embodiment is a secure join system that performs secure data joining between a first information processing apparatus and a second information processing apparatus, the second information processing apparatus including: a first creation unit configured to, when a first vector having a hash value related to a key value of first data held by the first information processing apparatus as an element and a second vector having a ciphertext of the first data corresponding to the key value as an element are received, create a third vector and a fourth vector in which the hash value of the element of the first vector and the element of the second vector are rearranged by permutation not known by the first information processing apparatus; a second creation unit configured to create a fifth vector having a hash value related to a key value of second data held by the second information processing apparatus as an element; and a first transmission unit configured to transmit the third vector, the fourth vector, and the fifth vector to the first information processing apparatus, and the first information processing apparatus including: a third creation unit configured to, when the third vector, the fourth vector, and the fifth vector are received, search for j in which a hash value of an i-th element of the fifth vector matches a value of a j-th element of the third vector for each i and create encrypted data in which a ciphertext of a value of a j-th element of the fourth vector is set as an i-th element in a case where j is found and a ciphertext of a dummy value is set as the i-th element in a case where j is not found, and a second transmission unit configured to transmit the encrypted data to the second information processing apparatus.

Advantageous Effects of Invention

Secure join with a small communication amount can be implemented.

BRIEF DESCRIPTION OF DRAWINGS

FIG. 1 is a diagram illustrating an example of an overall configuration of a secure join system according to the present embodiment.

DESCRIPTION OF EMBODIMENTS

Figure 2:
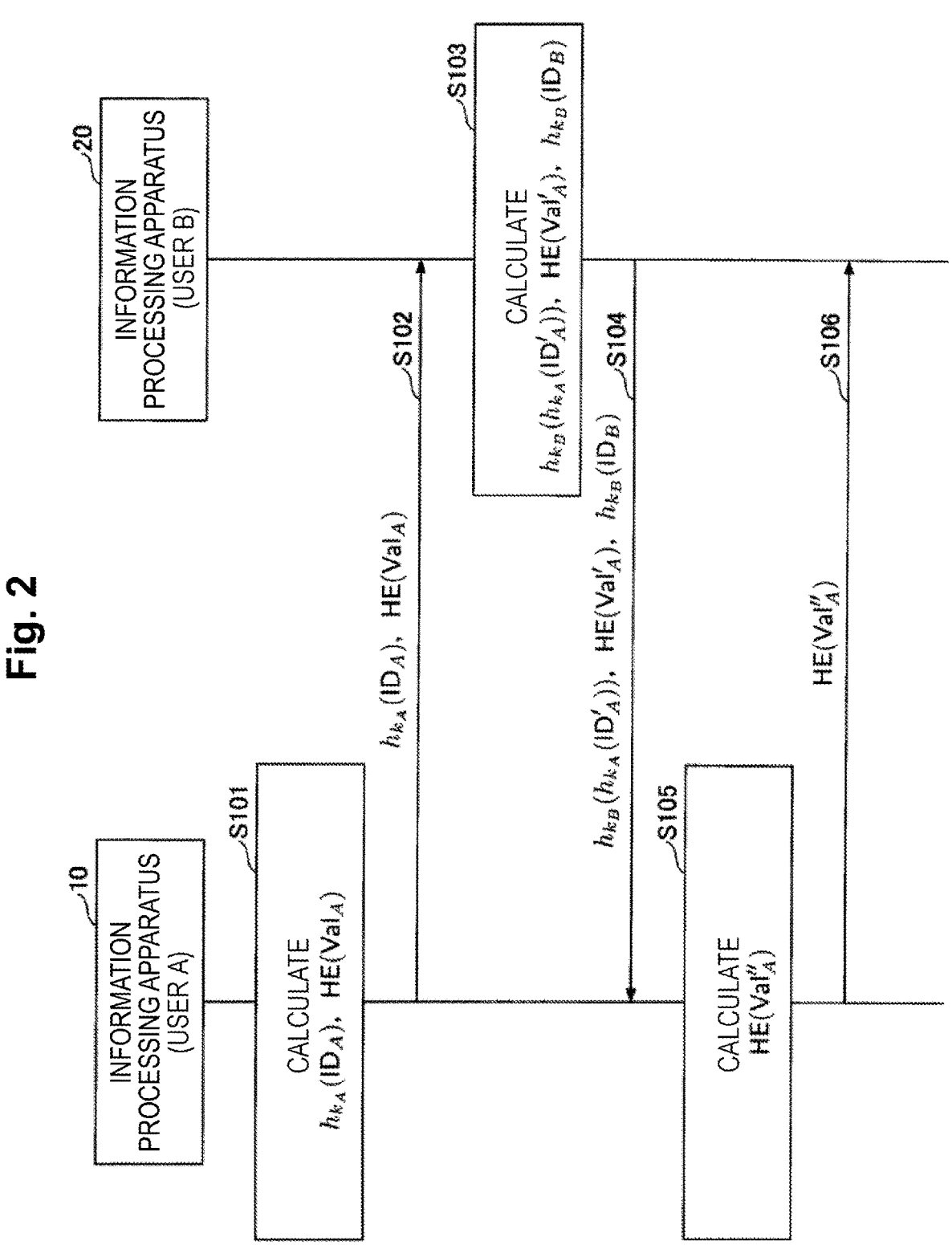
FIG. 2 is a sequence diagram illustrating an example of secure join processing according to the present embodiment.

Hereinafter, an embodiment of the present invention will be described. In the present embodiment, a secure join system 1 capable of realizing secure join between two parties without transmitting and receiving a ciphertext of data held by one party will be described. As a result, in the secure join system 1 according to the present embodiment, in a case where one party has large data, it is possible to perform secure join between two parties with a smaller communication amount than before. Note that the secure join is a method for joining data between two parties without disclosing mutual data or disclosing which data is joined. In addition, the data join is operation of joining data having the same value for a certain key.

Overall Configuration

Figure 1:
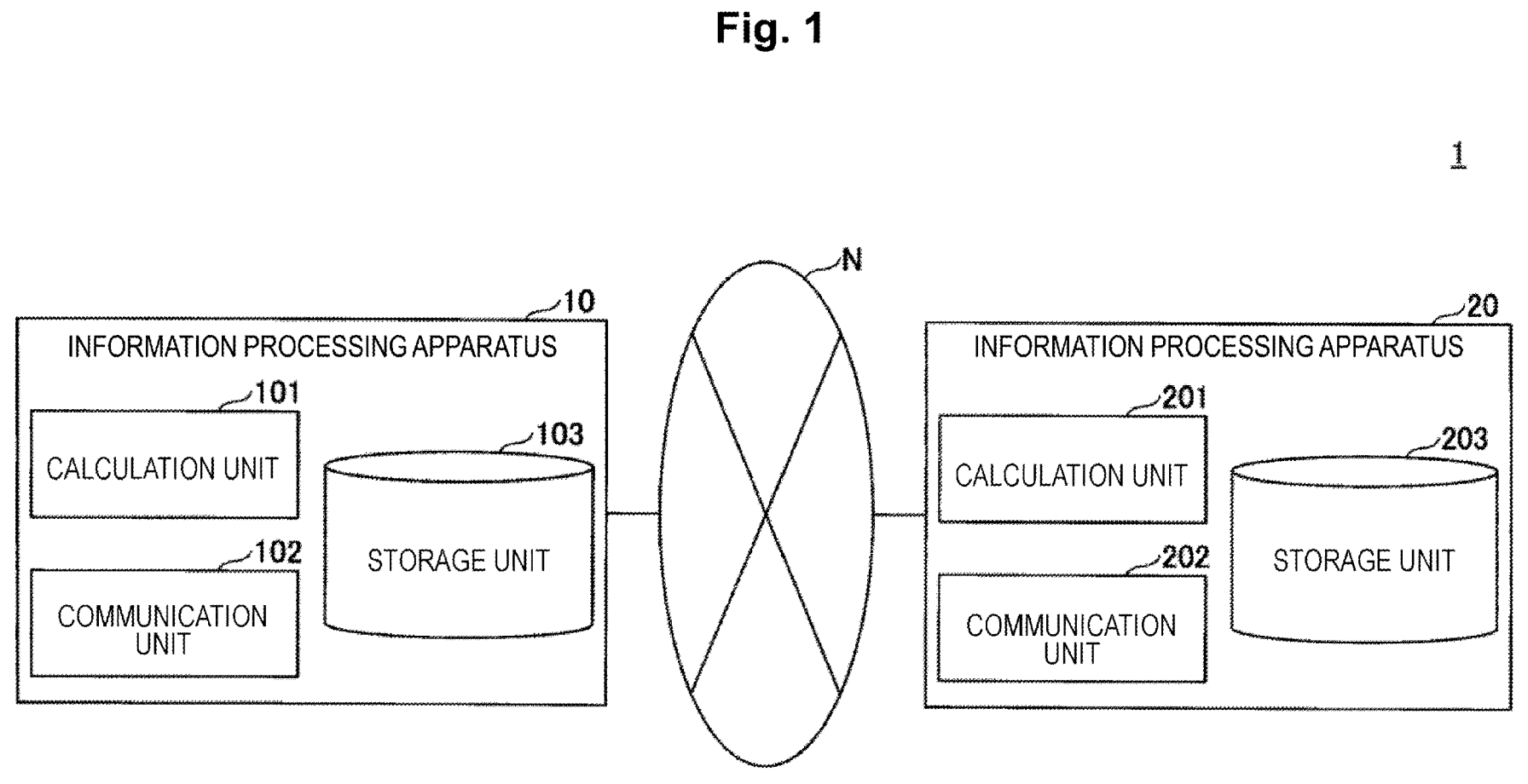

First, an overall configuration of the secure join system 1 according to the present embodiment will be described with reference to FIG. 1. FIG. 1 is a diagram illustrating an example of the overall configuration of the secure join system 1 according to the present embodiment.

As illustrated in FIG. 1, the secure join system 1 according to the present embodiment includes an information processing apparatus 10 and an information processing apparatus 20 that perform secure join between the two. The information processing apparatus 10 and the information processing apparatus 20 are communicably connected via a communication network N such as the Internet.

The information processing apparatus 10 and the information processing apparatus 20 are, for example, various devices and equipment such as a general-purpose server, a personal computer (PC), a smartphone, a tablet terminal, and a wearable device.

Here, the information processing apparatus 10 includes a calculation unit 101, a communication unit 102, and a storage unit 103. Note that the calculation unit 101 and the communication unit 102 are implemented by processing caused to be executed by a processor such as a central processing unit (CPU) by one or more programs installed in the information processing apparatus 10. Furthermore, the storage unit 103 is implemented by, for example, various memory devices such as a hard disk drive (HDD), a solid state drive (SSD), and a flash memory.

The calculation unit 101 executes various calculations for realizing secure join with the information processing apparatus 20. The communication unit 102 transmits and receives various data to and from the information processing apparatus 20. The storage unit 103 stores one or more pieces of data (these pieces of data may be referred to as "records") to be subjected to secure join. It is assumed that IDs serving as keys of joining are assigned to these pieces of data.

Furthermore, the information processing apparatus 20 includes a calculation unit 201, a communication unit 202, and a storage unit 203. Note that the calculation unit 201 and the communication unit 202 are implemented by processing caused to be executed by a processor such as a CPU by one or more programs installed in the information processing apparatus 20. Furthermore, the storage unit 203 is implemented by, for example, various memory devices such as an HDD, an SSD, and a flash memory.

The calculation unit 201 executes various calculations for realizing secure join with the information processing apparatus 10. The communication unit 202 transmits and receives various data to and from the information processing apparatus 10. The storage unit 203 stores one or more pieces of data (records) to be subjected to secure join. It is assumed that IDs serving as keys of joining are assigned to these pieces of data.

Note that, hereinafter, the information processing apparatus 10 itself or a person who uses or manages the information processing apparatus 10 is referred to as a "user A". Similarly, the information processing apparatus 20 itself or a person who uses or manages the information processing apparatus 20 is referred to as a "user B".

<Preparation>

Before the secure join processing is described, some symbols, concepts, and the like, are prepared.

It is assumed that $h_k$ is a hash function determined by a secret key k, and for any two secret keys $k_1$ and $k_2$, $$h_{k_1}, h_{k_2} \qquad \text{[Math. 1]}$$

is commutative. Here, arbitrary hash functions f and g being commutative indicate that $f(g(x))=g(f(x))$ holds for an arbitrary value x.

Hereinafter, as a secret key $k_A$ of the user A, a hash function determined by the secret key $k_A$ is expressed as "$h_{kA}$" in the text of the specification. Similarly, as a secret key $k_B$ of the user B, a hash function determined by the secret key $k_B$ is expressed as "$h_{kB}$" in the text of the specification.

Note that, in a case where x is a vector and an i-th element thereof is x[i], $h_k(x)$ is a vector in which $h_k(x[i])$ is the i-th element. In this event, the i-th element of $h_k(x)$ is also expressed as "$h_k(x)$ [i]".

HE is an encryption scheme in which the users A and B can re-encrypt. In a case where x is a vector and an i-th element thereof is x[i], HE(x) is a vector in which HE(x[i]) is the i-th element. In this event, the i-th element of HE(x) is also expressed as "HE(x)[i]".

In addition, it is assumed that $Val_A$ is a vector in which data of the user A to be subjected to secure join is arranged, $ID_A$ is a vector in which IDs corresponding to respective elements (that is, respective pieces of data of the user A) of $Val_A$ are arranged, and $ID_B$ is a vector in which IDs corresponding to respective pieces of data of the user B are arranged. However, it is assumed that the $Val_A$ and the $ID_A$ are arranged in an order not known to the user B, and the $ID_B$ is arranged in an order not known to the user A.

<Secure Join Processing>

Hereinafter, the secure join processing according to the present embodiment will be described with reference to FIG. 2. FIG. 2 is a sequence diagram illustrating an example of the secure join processing according to the present embodiment.

First, the calculation unit 101 of the information processing apparatus 10 calculates $h_{kA}(ID_A)$ and $HE(Val_A)$ (step S101). Next, the communication unit 102 of the information processing apparatus 10 transmits $h_{kA}(ID_A)$ and $HE(Val_A)$ to the information processing apparatus 20 (step S102).

When $h_{kA}(ID_A)$ and $HE(Val_A)$ are received by the communication unit 202, the calculation unit 201 of the information processing apparatus 20 executes the following (1-1) to (1-4) (step S103).

(1-1) Calculate $h_{kB}(ID_B)$.

(1-2) Create random permutation σ.

(1-3) Re-encrypt $HE(Val_A)$ and then rearrange it by σ. Hereinafter, the rearranged one is referred to as $HE(Val'_A)$.

(1-4) Calculate $\sigma(h_{kB}(h_{kA}(ID_A)))$. Hereinafter, a result obtained after this calculation is referred to as $h_{kB}(h_{kA}(ID'_A))$.

Next, the communication unit 202 of the information processing apparatus 20 transmits $h_{kB}(h_{kA}(ID'_A))$, $HE(Val'_A)$, and $h_{kB}(ID_B)$ to the information processing apparatus 10 (step S104).

When $h_{kB}(h_{kA}(ID'_A))$, $HE(Val'_A)$, and $h_{kB}(ID_B)$ are received by the communication unit 102, the calculation unit 101 of the information processing apparatus 10 executes the following (2-1) to (2-2) (step S105).

(2-1) Calculate $h_{kA}(h_{kB}(ID_B))$.

(2-2) Collate $h_{kA}(h_{kB}(ID_B))$ and $h_{kB}(h_{kA}(ID'_A))$, search for j in which $h_{kA}(h_{kB}(ID_B))$ [i]=$h_{kB}(h_{kA}(ID'_A))$ [j] for each i, and in a case where such j is found, create a value by re-encrypting $HE(Val'_A)$ [j] so that $Val''_A[i]=Val'_A$ [j] and set it as $HE(Val''_A)$ [i]. On the other hand, in a case where j in which $h_{kA}(h_{kB}(ID_B))$ [i]=$h_{kB}(h_{kA}(ID'_A))$ [j] is not found, a value obtained by encrypting a dummy value is created and set it as $HE(Val''_A)$ [i].

Note that, for each i, a method of searching for j in which $h_{kA}(h_{kB}(ID_B))$ [i]=$h_{kB}(h_{kA}(ID'_A))$ [j] is not particularly limited, and any general search method can be used. For example, it may be confirmed whether or not $h_{kA}(h_{kB}(ID_B))$ [i]=$h_{kB}(h_{kA}(ID'_A))$ [j] is satisfied for each i and j, or the corresponding j may be searched for by creating an associative array having $h_{kB}(h_{kA}(ID'_A))$ [j] as a key for each j in advance.

Then, the communication unit 102 of the information processing apparatus 10 transmits $HE(Val''_A)$ including $HE(Val''_A)$ [i] to the information processing apparatus 20 (step S106).

As described above, elements having the same value are associated with each other between $ID_A$ and $ID_B$, so that secure join is implemented between data of the user A and data of the user B. In this event, in the present embodiment, one of the final outputs is made into plain text (in the present embodiment, the data of the user B is made into plain text), so that the data join is implemented without transmitting the data on one party to the other. In addition, if no measure is taken at that time, which data is joined is revealed to the user B, and thus a dummy ciphertext is added to prevent which data is joined from being revealed.

Effects

In a case where secure join is performed between two parties, in related art, it has been necessary to transmit ciphertexts of data on both parties, but in the present embodiment, it is not necessary to transmit data on one party. Thus, in a case where there is a large difference in an amount of data held by both parties, it is possible to implement secure join with a small communication amount by using a larger amount of data as the data not to be transmitted.

More precisely, it is assumed that the user A has $n_A$ pieces of data including $m_A$ values, and the user has $n_B$ pieces of data including $m_B$ values. In this event, in related art, the communication amount has been required to be $\Theta(m_A n_A + m_A n_B)$, but in the present embodiment, secure join can be implemented with the communication amount of $\Theta(m_A n_A + m_A n_B)$. Thus, in a case where $m_A < m_B$, the secure join can be implemented with an asymptotically small communication amount by using the secure join described in the present embodiment.

<Hardware Configuration>

Figure 3:
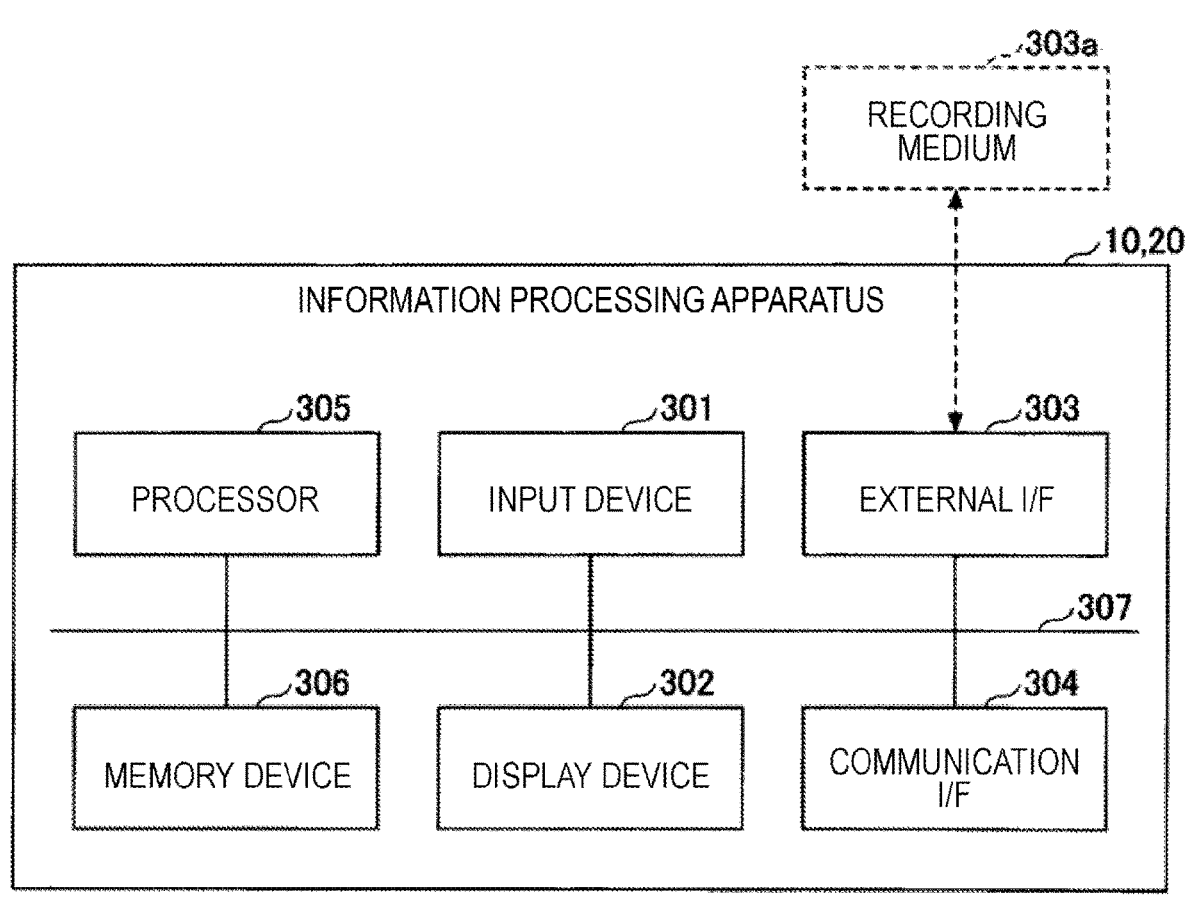
FIG. 3 is a diagram illustrating an example of a hardware configuration of an information processing apparatus according to the present embodiment.

Finally, hardware configurations of the information processing apparatuses 10 and 20 according to the present embodiment will be described with reference to FIG. 3. FIG. 3 is a diagram illustrating an example of the hardware configurations of the information processing apparatuses 10 and 20 according to the present embodiment. Note that the information processing apparatuses 10 and 20 can be implemented by substantially the same hardware configurations, and thus, the hardware configuration of the information processing apparatus 10 will be described below.

As illustrated in FIG. 3, the information processing apparatus 10 according to the present embodiment includes an input device 301, a display device 302, an external I/F 303, a communication I/F 304, a processor 305, and a memory device 306. These pieces of hardware are communicably connected by a bus 307.

The input device 301 is, for example, a keyboard and a mouse, a touch panel, or the like. The display device 302 is, for example, a display, or the like. Note that the information processing apparatus 10 does not have to include, for example, at least one of the input device 301 or the display device 302.

The external I/F 303 is an interface with an external device such as a recording medium 303a. The information processing apparatus 10 can perform reading, writing, and the like, of the recording medium 303a via the external I/F 303. Note that examples of the recording medium 303a include a compact disc (CD), a digital versatile disk (DVD), a secure digital memory card (SD memory card), a universal serial bus (USB) memory card, and the like.

The communication I/F 304 is an interface for connecting the information processing apparatus 10 to the communication network N. The processor 305 is one of various arithmetic devices such as a CPU, for example. The memory device 306 is, for example, various storage devices such as an HDD, an SSD, a flash memory, a random access memory (RAM), and a read only memory (ROM).

The information processing apparatuses 10 and 20 according to the present embodiment can implement the above-described secure join processing by having the hardware configuration illustrated in FIG. 3. Note that the hardware configuration illustrated in FIG. 3 is an example, and the information processing apparatuses 10 and 20 may include a plurality of processors, a plurality of memory devices, or various hardware configurations, for example.

The present invention is not limited to the above embodiment specifically disclosed, and various modifications and changes, combinations with known technologies, and the like, can be made without departing from the scope of the claims.

REFERENCE SIGNS LIST

1 Secure join system
10 Information processing apparatus
20 Information processing apparatus
101 Calculation unit
102 Communication unit
103 Storage unit
201 Calculation unit
202 Communication unit
203 Storage unit
301 Input device
302 Display device
303 External I/F
303a Recording medium
304 Communication I/F
305 Processor
306 Memory device
307 Bus
N Communication network

The invention claimed is:

1. A secure join system that performs secure data join between a first information processing apparatus and a second information processing apparatus, the secure join system comprising the first information processing apparatus and the second information processing apparatus, the second information processing apparatus being configured to:

receive a first vector having a hash value related to a key value of first data held by the first information processing apparatus as an element and a second vector having an encrypted element generated by applying a re-encryption capable encryption scheme to the first data corresponding to the key value as an element, after receiving the first and second vectors, create a third vector and a fourth vector that are generated by rearranging respective elements of the first vector and the second vector according to a permutation that is not known to the first information processing apparatus;

create a fifth vector having a hash value related to a key value of second data held by the second information processing apparatus as an element; and transmit the third vector, the fourth vector, and the fifth vector to the first information processing apparatus, and the first information processing apparatus being configured to:

after the third vector, the fourth vector, and the fifth vector are received, search for j in which a hash value of an i-th element of the fifth vector matches a value of a j-th element of the third vector for each i and create encrypted data in which a ciphertext of a value of a j-th element of the fourth vector is set as an i-th element in a case where j is found and a ciphertext of a dummy value is set as the i-th element in a case where j is not found; and transmit the encrypted data to the second information processing apparatus when a match was found,

wherein ID assigned to each piece of data serves as the key value for the data join, and the second information processing apparatus is further configured to:

generate the third vector and the fourth vector by applying a commutative hash function determined by a secret key to the IDs of the first data and by encrypting values of the first data using the re-encryption capable encryption scheme, and generate the permutation used for rearranging the first vector and the second vector, and the first information processing apparatus is further configured to assign, when no element of the third vector matches an element of the fifth vector, as the corresponding element, a dummy ciphertext that is indistinguishable in appearance from a ciphertext of actual data.

2. The secure join system according to claim 1, wherein, when f and g are commutative hash functions, the first information processing apparatus being further configured to:

calculate a hash value, by f, of the key value of the first data held by the first information processing apparatus and create the first vector having the hash value as the element and the second vector having the ciphertext of the first data corresponding to the key value as the element; and transmit the first vector and the second vector to the second information processing apparatus, when the first vector and the second vector are received, the second information processing apparatus calculates a hash value, by g, of the element of the first vector and rearranges the hash value, by g, of the element of the first vector and the element of the second vector by the permutation to create the third vector and the fourth vector, the second information processing apparatus creates the fifth vector having a hash value, by g, of the key value of the second data as the element, and when the third vector, the fourth vector, and the fifth vector are received, the first information processing apparatus calculates a hash value, by f, of the i-th element of the fifth vector, searches for j in which the hash value matches a value of the j-th element of the third vector and creates encrypted data in which the ciphertext of the value of the j-th element of the fourth vector is set as the i-th element in a case where j is found and the ciphertext of the dummy value is set as the i-th element in a case where j is not found.

3. An information processing apparatus that performs secure data join with another information processing apparatus, the information processing apparatus comprising:

a processor; and a memory storing program instructions that cause the processor to:

receive a first vector having a hash value related to a key value of first data held by the another information processing apparatus as an element and a second vector having an encrypted element generated by applying a re-encryption capable encryption scheme to the first data corresponding to the key value as an element are received, after receiving the first and second vectors, create a third vector and a fourth vector that are generated by rearranging respective elements of the first vector and the second vector according to a permutation that is not known to the first information processing apparatus;

create a fifth vector having a hash value related to a key value of second data held by the information processing apparatus as an element; and transmit the third vector, the fourth vector, and the fifth vector to the another information processing apparatus when a match was found, wherein ID assigned to each piece of data serves as the key value for the data join, and the program instructions further cause the processor to:

generate the third vector and the fourth vector by applying a commutative hash function determined by a secret key to the IDs of the first data and by encrypting values of the first data using the re-encryption capable encryption scheme, and generate the permutation used for rearranging the first vector and the second vector.

4. An information processing apparatus that performs secure data join with another information processing apparatus, the information processing apparatus comprising:

a processor; and a memory storing program instructions that cause the processor to:

receive a third vector and a fourth vector that are generated at the another information processing apparatus by rearranging respective elements of the first vector and the second vector according to a permutation that is not known to the first information processing apparatus, the first vector having a hash value related to a key value of first data held by the information processing apparatus as an element and the second vector having an encrypted element generated by applying a re-encryption capable encryption scheme to the first data corresponding to the key value as an element, and a fifth vector having a hash value related to a key value of second data held by the another information processing apparatus as an element, search for j in which a hash value of an i-th element of the fifth vector matches a value of a j-th element of the third vector for each i and create encrypted data in which a ciphertext of a value of a j-th element of the fourth vector is set as an i-th element in a case where j is found and a ciphertext of a dummy value is set as an i-th element in a case where j is not found; and transmit the encrypted data to the another information processing apparatus when a match was found, wherein ID assigned to each piece of data serves as the key value for the data join, and the program instructions cause the processor to assign, when no element of the third vector matches an element of the fifth vector, as the corresponding element, a dummy ciphertext that is indistinguishable in appearance from a ciphertext of actual data.

5. A secure join method for performing secure data join between a first information processing apparatus and a second information processing apparatus, the secure join method comprising:

receiving, by the second information processing apparatus, a first vector having a hash value related to a key value of first data held by the first information processing apparatus as an element and a second vector having an encrypted element generated by applying a re-encryption capable encryption scheme to the first data corresponding to the key value as an element, after receiving the first and second vectors, creating, by the second information processing apparatus, a third vector and a fourth vector that are generated by rearranging respective elements of the first vector and the second vector according to a permutation that is not known to the first information processing apparatus;

creating, by the second information processing apparatus, a fifth vector having a hash value related to a key value of second data held by the second information processing apparatus as an element; and transmitting, by the second information processing apparatus, the third vector, the fourth vector, and the fifth vector to the first information processing apparatus, and after the third vector, the fourth vector, and the fifth vector are received, searching, by the first information processing apparatus, for j in which a hash value of an i-th element of the fifth vector matches a value of a j-th element of the third vector for each i and creating encrypted data in which a ciphertext of a value of a j-th element of the fourth vector is set as an i-th element in a case where j is found and a ciphertext of a dummy value is set as the i-th element in a case where j is not found; and transmitting, by the first information processing apparatus, the encrypted data to the second information processing apparatus when a match was found, wherein ID assigned to each piece of data serves as the key value for the data join, and the secure join method further comprises:

generating, by the second information processing apparatus, the third vector and the fourth vector by applying a commutative hash function determined by a secret key to the IDs of the first data and by encrypting values of the first data using the re-encryption capable encryption scheme, and generating, by the second information processing apparatus, a permutation used for rearranging the first vector and the second vector is, and wherein the secure join method further comprises:

assigning, when no element of the third vector matches an element of the fifth vector, as the corresponding element, a dummy ciphertext that is indistinguishable in appearance from a ciphertext of actual data.

6. A non-transitory computer-readable recording medium having stored therein a program for causing the first information processing apparatus and the second information processing apparatus to execute the secure join method according to claim 5.

7. The secure join system according to claim 1, wherein the first information processing apparatus does not transmit a ciphertext of the first data itself to the second information processing apparatus.

8. The secure join system according to claim 1, wherein the dummy ciphertext is generated by using the same encryption scheme used to generate the encrypted element included in the second vector.

* * * * *